United States Patent [19]

Tippmann

[11] 4,011,765

[45] Mar. 15, 1977

[54] BALL AND CONE FRICTION TRANSMISSION WITH OPTIMALLY ADAPTED CONE ANGLE

[75] Inventor: Heinrich Tippmann, Munich, Germany

[73] Assignee: ITT Industries, Inc., New York, N.Y.

[22] Filed: July 23, 1975

[21] Appl. No.: 598,211

[30] Foreign Application Priority Data

Aug. 1, 1974 Germany .......................... 2437174

[52] U.S. Cl. .................................. 74/193; 74/198; 74/200
[51] Int. Cl.² .................. F16H 15/16; F16H 15/26; F16H 15/08
[58] Field of Search ..................... 74/193, 200, 198

[56] References Cited

UNITED STATES PATENTS

| | | | |
|---|---|---|---|
| 2,272,509 | 2/1942 | Cavallo | 74/193 |
| 3,026,736 | 3/1962 | Petzhold | 74/193 |
| 3,272,025 | 9/1966 | Stieber | 74/193 X |

*Primary Examiner*—Leonard H. Gerin
*Attorney, Agent, or Firm*—William T. O'Neil

[57] ABSTRACT

A ball and cone type variable ratio mechanical transmission in which the cone angles are chosen to provide optimum efficiency, increased power handling capability and extended service life.

3 Claims, 4 Drawing Figures

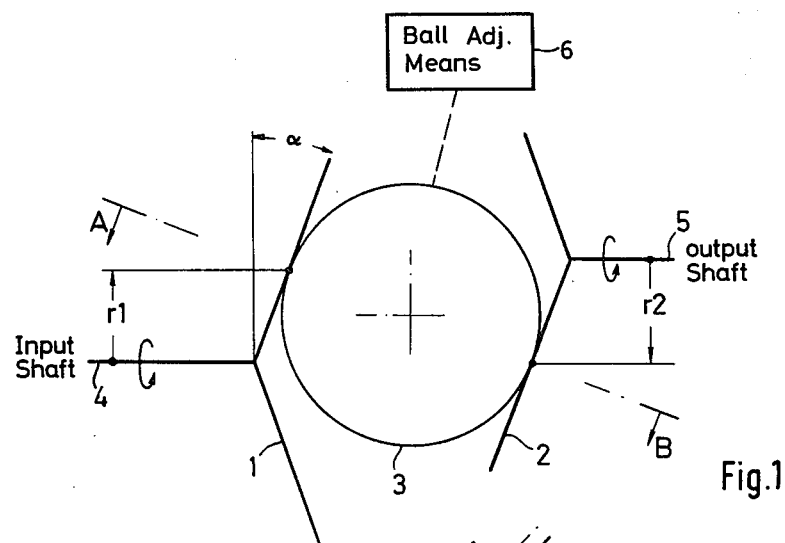
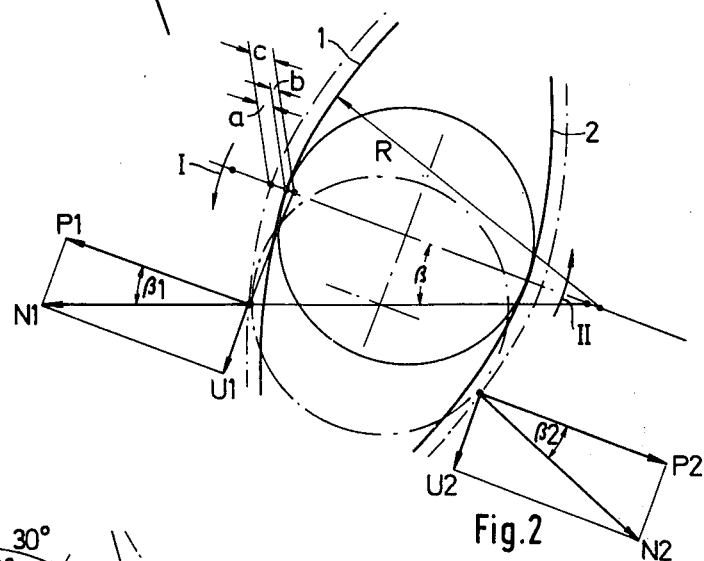
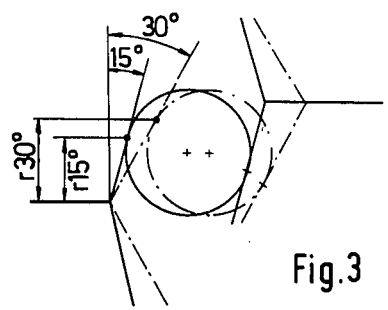
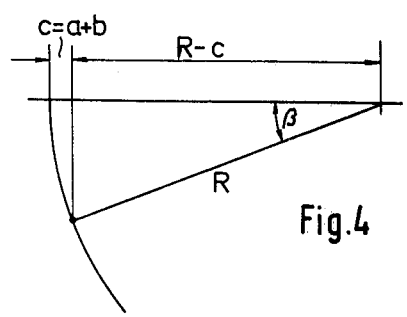

BALL AND CONE FRICTION TRANSMISSION WITH OPTIMALLY ADAPTED CONE ANGLE

BACKGROUND OF THE INVENTION

1. Field of the Invention

The invention relates to ball and cone, variable-ratio, mechanical transmissions.

2. Description of The Prior Art

In the prior art, the ball and cone (ball friction) type of mechanical transmission is known. Its use provides a smoothly variable transmission ratio for applications where step-wise ratio variation is undesirable. Particular examples are disclosed in the patent literature of various industrial nations, and these prior art devices have one particular feature in common, namely a large interior angle of the cone concave surfaces in contact with the friction ball.

It has been assumed in the prior art, that a relatively large interior cone surface angle (small exterior angle) is advantageous for reducing operating friction and wear as a function of the level of power transmitted.

The following table lists the cone angles of some known friction transmissions.

|  | Exterior Cone Angle |
| --- | --- |
| German Patent 1,176,422 | 12° |
| German Patent 1,102,516 | 54° |
| German Patent 864,021 | 8°–15° |
| German Patent 720,240 | 34° |
| German Patent 721,825 | 35° |

The cone angle or exterior angle in the sense of the above table and in the arrangement of the invention is the angle which is designated $\alpha$ in FIG. 1 of the accompanying drawing, i.e., the angle between the conical surface and a line perpendicular to the input or output shaft, these shafts being substantially parallel to each other.

If a very small or very large exterior cone angle ($\alpha$) is chosen (cf. table), the operation of the device will be insured, but optimum efficiency will not be achieved.

The manner in which the present invention provides optimization of operability, life and efficiency will be evident from the description hereinafter.

SUMMARY OF THE INVENTION

New investigations for determining the aforementioned cone angle $\alpha$ have shown that optimization can be achieved if a particular range is used for the cone angle $\alpha$.

It therefore may be said to be the general object of the present invention to fix the range for the cone angle in such a manner than an optimum efficiency of the entire transmission is achieved.

The invention is characterized in that the said exterior cone angle $\alpha$, measured between an assumed perpendicular to the input or output shaft and the conical surface, is chosen to have a value in the range from 18° to 28°.

The invention has many advantages over the known friction transmissions of this kind. In the known devices the number of starting operations at increased output speed and under load was limited, and the devices frequently provided only a relatively short service life. If the angles of the driving and driven cones are selected to be within the specified limits determined in accordance with the invention, without changing any other component in its size or material, the number of starting operations during the service life is considerably increased, even at twice the input and output powers. In accordance with the arrangement of the invention, for comparable size units, powers are achieved which closely approach those which much more expensive mechanical transmissions can handle. Moreover, the specific surface pressure is decreased.

BRIEF DESCRIPTION OF THE DRAWINGS

FIG. 1 illustrates the principle of the ball friction transmission according to the invention.

FIG. 2 is a section taken along line A–B of FIG. 1.

FIG. 3 is a representation showing the change of effective radii as a function of the change of cone angle.

FIG. 4 is a representation serving to explain the formula $$\cos \beta = (R-c)/R = (1 - (c/R)).$$

DESCRIPTION OF THE PREFERRED EMBODIMENT

In FIG. 1, the cone joined at its apex to the input shaft 4 is designated 1. Between this cone and the cone 2 similarly joined to the output shaft 5, a ball 3 is provided which transmits the driving forces from the cone 1 via the cone 2 to the output shaft 5.

The cone 1 is in contact with the ball 3 at the effective radius $r1$, and the ball 3, in turn, contacts the cone 2 at the effective radius $r2$. By shifting the ball 3 between the cones 1 and 2 parallel to the conical surfaces by means of a suitable adjusting element identified symbolically at 6 on FIG. 1, the radii $r1$ and $r2$ and, consequently, the transmission ratio $i = r2/r1$ between input shaft 4 and output shaft 5 are varied. The specific form of this adjusting element is not a part of the present invention. It may be of one of the known forms from the prior art above-referenced, for example. The ball is permitted to rotate, but is, of course, constrained from translational movement in a manner to be understood from the following description, except for ratio adjustment.

The angle $\alpha$ shown in FIG. 1 is equal for both cones 1 and 2. A change of the angle $\alpha$ at the cone 1 requires the same change of the angle $\alpha$ at the cone 2 in order that equal angular ratios are given at the driving and driven ends.

FIG. 2 shows the indicated sectional view of the ball friction transmission device of FIG. 1. When the cone 1, joined to the input shaft 4, begins to rotate in the direction indicated by the arrow I, and the cone 2, joined to the output shaft 5, has a given braking (reaction) torque applied thereto, the ball 3 will shift to the side as far as the overall elasticity of the device (which is never infinitely stiff) permits. As a result, the cones 1 and 2 are forced apart to the dashed line position. When, after the start of operating, the inner forces and the outer driving and output torques are in equilibrium, the ball 3 transmits the driving torque to the cone 2 and thus to the output shaft 5, which is joined to the cone 2. The following forces are exerted:

Driving end

U1 = circumferential force at the radius $r1$ at the driving cone;

P1 = P2 = expanding force urging the two cones 1 and 2 apart, and

N1 = normal force at the point of contact between ball and cone, resulting from U1 and P1.

Driven end

Because of the angle and the friction between ball 3 and cone 2, the expanding force P2, which represents a reaction to P1, results in a circumferential force U2, which, together with P2, forms the resultant normal force N2.

The torque capable of being transmitted follows from the product of force multiplied by the force arm length. In this case, the force is U1 or U2, and the force arm $r1$ or $r2$, respectively.

Looking at the dependence of the values r and U on the cone angle $\alpha$, it can be seen that, at a constant center distance between the input and output shafts, the value r increases as the cone angle $\alpha$ increases. Hence, the greater the cone angle $\alpha$, the greater is $r$ (see also FIG. 3).

The circumferential force U is dependent on the angle $\beta$ in the force diagram (see also FIG. 4). Assuming that two comparable transmissions with different cone angles have equal internal elasticity of all components, and that the expanding force P is the same, the distances $a$ travelled in the axial shaft direction by the two cones 1 and 2 will be equal in both devices.

The section taken along line A-B shows part of the hyperbolas of the cones 1 and 2. The greater the cone angle, i.e., the more acute the interior angle, the smaller the resultant radius R.

From FIG. 4, the following relationship is apparent:

$$\cos \beta = (R-c)/R = (1 - c/R).$$

Even if the value $c$ is assumed to be at a constant value $a$, the value $c/R$ will become greater, and the value $(1 - (c/R))$ smaller, with increasing angle $\alpha$ and, consequently, decreasing the resultant radius R. As the value $(1 - (c/R))$ decreases, the angle $\beta$ increases. However, after the value $c$ increases with increasing angle $\beta$ and, consequently, the value $c$ increases at a constant value $a$, the expression $c/R$ grows additionally, which corresponds to an accelerated increase of the angle $\beta$ at a constant value $a$ and with increasing angle $\alpha$. Thus, as the angle $\alpha$ increases, the circumferential force U increases without the expanding force P1 becoming greater, i.e., no additional surface pressure between cone and ball is caused, and no additional load is placed on the cone shaft thrust bearings. The same is true if the radius r increases.

According to friction physical law, a body begins to slide under an obliquely applied force $P_R$ when the expression $(R/N) = tg \, \delta$ exceeds the coefficient of friction $\mu$.

In the case of hardened all-steel parts with ground surfaces and oil lubrication, this coefficient of friction $(\mu \approx tg \, \beta)$ ranges between 0.06 and 0.09, dependent on the type of oil used. Hence, it follows that the angles $\beta$ and $\alpha$ must lie within certain limits.

If these values are exceeded, premature slipping will occur. If the values are too far below these limits, the transmission cannot be fully utilized (i.e., effienty is low).

A long series of tests has shown that the power capacity increases noticeably from a cone angle ($\alpha$) of above 18°, and that the cones begin to slip prematurely if the angle is above 28°.

In addition, of course, the overall performance of the transmission is influenced by the ratio of the center distance between the two cones to the ball diameter, but a change of this ratio is less significant than a change of the cone angle $\alpha$.

What is claimed is:

1. A friction type, variable-ratio mechanical transmission having a pair of rotationally-mounted, concave members generally facing each other with a laterally adjustable rotational member therebetween and in frictional contact with said concave members, comprising:

means defining a conical surface on each of said concave members, each of said conical surfaces having an apex;

and a rotatable shaft joined to each of said concave members at said apex thereof, said shafts extending axially in spaced mutually parallel relationship oppositely from the direction of concavity of the corresponding conical surface to provide said concave member rotational mounting;

the angle made between each of said conical surfaces and a line normal to the corresponding shaft being not less than 18° nor more than 28°.

2. Apparatus according to claim 1 in which said transmission is further identified as being of the ball and cone type, and in which said rotational member is a ball in frictional contact with said conical surfaces of both of said concave members.

3. Apparatus according to claim 2 in which said ball is of a diameter at least a major fraction of the axial spaces between the apices of said conical surfaces.

* * * * *